Patented Jan. 1, 1946

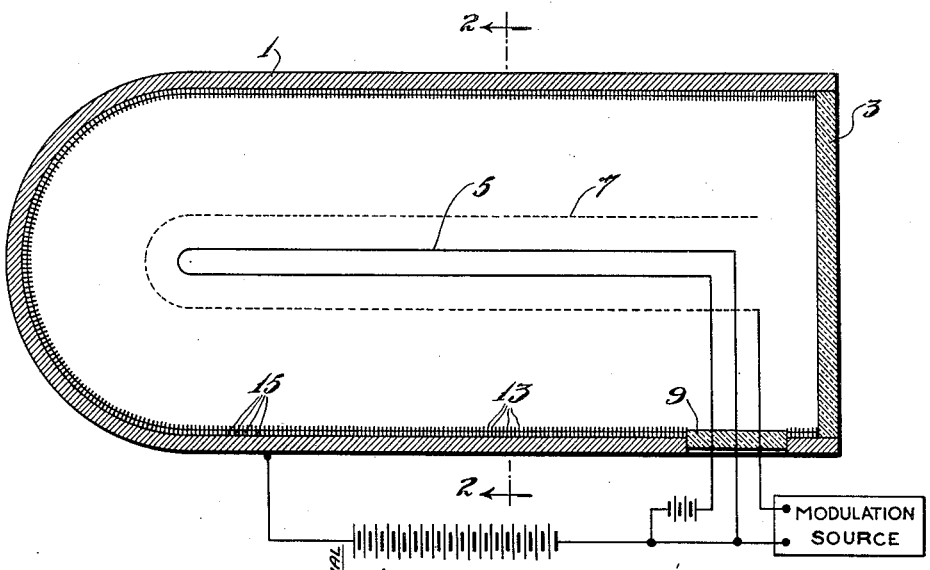
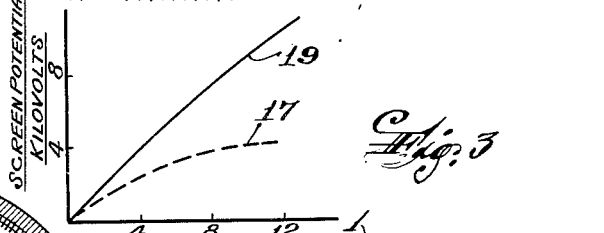
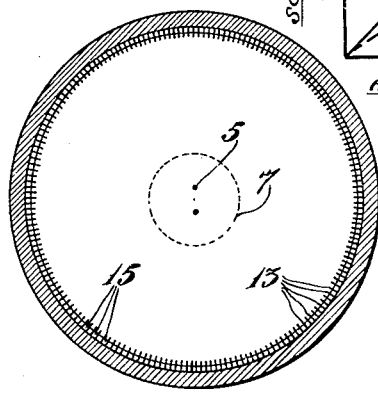
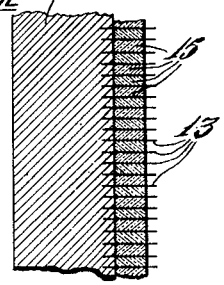

2,392,161

UNITED STATES PATENT OFFICE 2,392,161

LUMINESCENT LIGHT SOURCE

Humboldt W. Leverenz, South Orange, N. J., assignor to Radio Corporation of America, a corporation of Delaware Application September 30, 1942, Serial No. 460,183

2 Claims. (Cl. 176—122)

My invention relates to luminescent light sources and particularly to luminescent lamps having an improved luminescent screen.

Many luminescent lamps utilize a phosphor screen comprising a foundation coated with luminescent material which is subjected to corpuscular excitation such as electron bombardment for developing light. Such screens have a tendency to collect electrons and assume a potential near that of the electron source so that the efficiency of the device in which the screen is used is decreased. It has been proposed to utilize graphite or carbon admixed with the luminescent material to provide conduction from the exposed surface of a luminescent screen to a conducting foundation electrode, but this method of neutralizing charges acquired by the screen during operation is disadvantageous because the graphite or carbon absorbs an excessive amount of the developed light. In addition, the contact resistance of the graphite-luminescent material admixture is relatively high resulting in poor electrical conductivity, and the graphite effectively dilutes the concentration of luminescent material in each unit area of the screen.

It is an object of my invention to provide a luminescent light source of high efficiency wherein the screen has little or no tendency to assume bound charges when subjected to corpuscular excitation. It is another object to provide positive contact, resistance-free conduction between the exposed surface of a luminescent screen and a conducting electrode. It is a further object to provide a luminescent screen assembly having high electrical conductivity whereby the accumulation of charges thereon is prevented. It is a still further object to provide a luminescent screen having high luminescent efficiency over each unit area thereof and a screen which has a minimum light loss by absorption.

In accordance with my invention I provide a luminescent light source having fibrillar conducting elements in electrical contact with and projecting from an electrical conducting foundation and through a luminescent deposit, the distal ends of the fibrillar projections constituting a minor area with respect to the total screen area subjected to the incident excitation. Further in accordance with my invention I provide a luminescent screen having means to neutralize charges collected by the screen, said means being highly reflecting to assure maximum efficiency of light emission. These and other objects, features and advantages of my invention will appear from the following description thereof with reference to the accompanying drawing wherein:

Figure 1 is a cross-sectional plan view of a luminescent lamp incorporating a luminescent screen made in accordance with my invention;

Figure 2 is a cross-sectional view of the structure shown in Figure 1 taken along the line 2—2;

Figure 3 is an enlarged fragmentary view of the screen structure shown in Figures 1 and 2, and Figure 4 is a graph comparing the operation of my target structure with a prior art structure.

Referring to the drawing, I have shown an embodiment of my invention as applied to a luminescent lamp, although it will be appreciated that my invention is of equal application to luminescent light sources in general. Referring to Figure 1, a device incorporating my invention comprises in simplified form an envelope 1 preferably of metal or other electrically conducting material in the form of a round-bottom tube closed at one end with a transparent window 3 to transmit the light developed within the envelope. The envelope may be of non-conducting material, in which case I provide a relatively thick conductive, preferably metal, coating on the inner wall thereof. Within the envelope 1, I provide an electron source which may be either of the indirectly heated type or may comprise a filamentary cathode 5 as a source of electrons. Surrounding the cathode 5, I may provide a control electrode such as a grid 7 to modulate the electron flow from the cathode so that the electron flow may be limited to any desired intensity or period of flow. The cathode 5 and the grid 7 may be electrically connected through an insulating portion 9 sealed in the envelope wall inasmuch as the envelope is of metal, although the electrical connection to the electrodes may be made through a marginal portion of the window 3 without materially interfering with the operation of the device. The cathode 5 and conducting envelope wall as an anode are connected to a power source such as the battery 11, although an alternating source may be used.

In accordance with my invention I provide on the inner surface of the conducting envelope wall a great multiplicity of fibrillar conducting elements projecting therefrom and electrically conductive therewith, and I provide a quantity of luminescent material between the interstices of the fibrillar conducting elements. Referring to the drawing, I have shown a great multiplicity of the fibrillar conducting elements 13 over the entire inner surface of the envelope 1 with the exception of the window 3 and the small insulating portion 9. As best shown in Figure 3, the fibrillar elements 13 are of exceedingly small diameter and are embedded in electrically conducting relation in the metal wall of the envelope 1 which serves as a screen foundation, and I provide intermediate the fibrillar elements 13 a mass or a coating of luminescent material 15 in direct contact with the fibrillar elements. The fibrillar elements 13 may be of exceedingly fine wire struck into the metal foundation, these elements serving to support the luminescent material 15 in direct contact with the foundation, and the foundation may be light permeable such as a wire mesh screen supporting the fibrils on the side thereof bearing the coating of luminescent material. Further in accordance with my invention I provide the fibrillar elements 13 of highly reflecting material embedded in a conducting foundation preferably of metal which is likewise provided with a highly reflecting surface so that substantially no light developed by the luminescent material 15 is lost by absorption either by the fibrillar elements or by the foundation. Consequently, light liberated by the luminescent material 15 between the fibrils is substantially wholly utilized in the operation of the device shown in Figure 1. The light excited in the luminescent material is reflected internally and emitted through the transparent window 3 and, by virtue of extending the axial length of the device, very high light brilliancies may be obtained.

Referring to Figure 4, I have shown a graph wherein the dashed curve 17 represents variation in screen potential of a tungstate phosphor with respect to applied potential producing the acceleration of electrons incident on the phosphor. It will be noted that the ratio of screen potential to applied potential rapidly decreases as the applied potential is increased above 8 kilovolts. This is primarily due to the inability of the screen to dissipate bound charges developed thereon because of low secondary emission at the higher beam velocities. However, a screen made in accordance with my invention has a screen potential characteristic more nearly approaching the curve 19 which is substantially a straight line, showing that the screen potential is substantially directly proportional to applied potential.

Further in accordance with my invention I may provide a structure having varying luminescent efficiency over the surface of a luminescent screen. The number of fibrils over a given screen area is determinative of the ratio of screen potential to applied potential. Referring to Figure 4, the slope of the curves is dependent upon the number of fibrils per unit area. Thus in accordance with one teaching of my invention I provide a screen having an extended area, minor areas of which are provided with a greater number or larger cross-sectional area of fibrils than other adjacent areas. For example, in television projection or oscillograph tubes utilizing luminescent screens the electron beam may have a greater sweep velocity over one area than another area or areas of the screen. Therefore I may provide a greater number or greater exposed fibril area over the screen area where the beam has the greatest sweep velocity to increase the efficiency over this area, and a smaller number or smaller exposed fibril area over the area where the beam has the lower sweep velocity. Similarly, the number or fibril area may be increased across the screen in the direction of beam scansion the number or area varying in accordance with variation in the electron beam sweep velocity.

The fibrillar elements 13 may be deposited either before or after the luminescent material 15 is applied to the wall of the envelope 1, although if the fibrillar elements are attached prior to application of the luminescent material, they are effective in preventing sliding or avalanching of the phosphor which is usually in the form of small particles. I prefer to use at least some fibrillar elements having curved or rectilinear cross-sections whereby the luminescent material may be more effectively supported than with fibrils having circular cross-sections.

The fibrils should occupy a cross-section area (parallel to the plane of the screen) not exceeding about 10 per cent of the total screen area and preferably of the order of 0.1 to 1 per cent of the total screen area. Furthermore, the effective cross-section area of each fibril should not exceed about one (1) square millimeter and should be preferably about 0.0025 to 0.4 square millimeter. The distribution of the fibrils should be substantially uniform, i. e. each circular screen area encompassing 10 fibrils should not vary by more than ±60 per cent and preferably by not more than ±20 per cent, except in some cases where certain screen areas must conduct more curent than the average, in which cases the population density or the diameters of the fibrils may be increased in proportion to the increased current carrying requirements as long as the total area of the fibrils is less than about 10 per cent of the total screen area. The number of fibrils per square inch of the screen should not be less than ten and preferably should be from 20 to 100 or more.

As indicated above, the fibrillar elements 13 are embedded in the foundation at their proximal ends and, in accordance with my invention, I may forcibly inject the fibrillar elements into the conducting foundation. For example, the fibrillar elements may be of a hard metal, such as tungsten, and may be shot into a foundation of softer metal which may be heated to render it more ductile. High melting point elements such as of tungsten are also desirable to prevent melting or volatilization when bombarded by high velocity electrons. Alternatively, the fibrillar elements may comprise very small diameter conducting magnetic threads, rods or other small diameter elongated shapes of metal which may be aligned by a magnetic or electrostatic field during their projection upon the foundation so that they may be kept oriented and will strike the surface of the foundation substantially perpendicularly. This operation may be performed in a partial vacuum or an atmosphere of a light gas, such as hydrogen, so that the tendency of the atmosphere to de-orient the rods or threads as they are projected through space may be minimized.

A further method of providing my structure may be followed by stacking a number of fibrillar or ciliary metal threads embedded except for their ends in a sheet of low-melting point or easily soluble material, such as cellulose-acetate, and then sharply striking the cold stack of rods or threads upon the metal foundation so that they become partially embedded therein. Here again the use of hard metal elements and a softer metal foundation is desirable. Alternatively, the rods or threads may be welded to the foundation so that good electrical contact and mechanical support with the foundation is obtained. For example, a stack of aligned elements may be provided mutually separated one from another by low-melting point or easily soluble insulating material. The stack may then be placed with the proximal ends of the fibrillar elements in contact with the metal foundation and the distal ends of the elements connected together such as by a pool of mercury. Electric current may then be made to flow between the pool of mercury and the foundation through the fibrillar elements, the resistance between the foundation and the proximal ends of the fibrillar elements developing heat, thereby welding the elements to the foundation. Following the welding operation, the low melting point or easily soluble material may be removed from between the fibrillar elements whereupon the interstices may be filled with luminescent material settled through a suspending solution or by spraying the material on the foundation areas exposed between the fibrillar elements. If luminescent material particles become deposited upon the exposed (distal) ends of the fibrils, such undesirable particles may be removed by light brushing or scraping of the screen. The exposed fibril length should be such that adjacent fibrils would not engage each other if they should be bent parallel to the screen surface.

As indicated above, both the fibrillar elements and the conducting foundation are preferably highly reflecting to minimize loss of the light by absorption. The reflecting characteristics may be obtained by polishing the foundation surface such as by an electrolytic polishing method prior to the attachment of the fibrils, although mechanical processes may be used to equal advantage. The fibrillar elements may be likewise polished or may be made of highly polished material so that they do not absorb the developed light.

Luminescent screens made in accordance with my invention are capable of efficient operation at lower accelerating potentials applied between the cathode and the foundation than is possible without the use of conducting elements extending through and in contact with both the foundation and the luminescent material. My luminescent screens have greater efficiency even at higher accelerating potentials due to having provided the full applied potential at the surface of the luminescent material. Very thick screens of luminescent materials may be used without relying upon the liberation of secondary electron emission to maintain the surface at a potential near the applied potential, and consequently my structure is particularly applicable in high voltage projection-type screens and in high intensity light sources comprising cathode ray excited luminescent materials.

I claim:

1. A luminescent light source comprising a relatively soft metal foundation, a coating of luminescent material on said foundation and a plurality of closely spaced refractory metal fibrils distributed over, embedded in and in electrical contact with the surface of said foundation, said fibrils extending through said coating with their distal ends extending from the exposed surface of said coating.

2. A luminescent device having a metal bulb adapted to be connected to a positive potential of a source, a translucent window in said metal bulb, a cathode in said bulb adapted to be connected to a negative potential of said source, a multiplicity of short metal wires having their ends secured in good electrical contact to the inner side of said bulb, said wires extending substantially perpendicular to said inner side and having polished ends adapted to reflect light, and a filling of luminescent material around and between said wires adapted to fluoresce by impact of electrons from said cathode, said wires dissipating the negative charges produced by said electrons and the reflecting ends thereof reflecting the phosphorescent light incident therein.

HUMBOLDT W. LEVERENZ.